US010754160B2

(12) United States Patent
Cakmakci et al.

(10) Patent No.: US 10,754,160 B2
(45) Date of Patent: Aug. 25, 2020

(54) SEE-THROUGH CURVED EYEPIECE WITH PATTERNED OPTICAL COMBINER (71) Applicant: Google LLC, Mountain View, CA (US)

(72) Inventors: Ozan Cakmakci, Sunnyvale, CA (US); James C. Dunphy, San Jose, CA (US); Oscar A. Martinez, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 150 days.

(21) Appl. No.: 15/924,770

(22) Filed: Mar. 19, 2018

(65) Prior Publication Data

US 2018/0252923 A1     Sep. 6, 2018

Related U.S. Application Data (63) Continuation of application No. 15/093,235, filed on Apr. 7, 2016, now Pat. No. 9,946,074.

(51) Int. Cl.
*G02B 27/01* (2006.01)
*G02B 6/00* (2006.01)
*F21V 8/00* (2006.01)

(52) U.S. Cl.
CPC .......... *G02B 27/0172* (2013.01); *G02B 6/00* (2013.01); *G02B 6/003* (2013.01); *G02B 27/01* (2013.01);
(Continued)

(58) Field of Classification Search
CPC .............. G02B 27/0172; G02B 27/01; G02B 27/0101; G02B 27/017; G02B 6/00;
(Continued)

(56) References Cited

U.S. PATENT DOCUMENTS 5,761,364 A * 6/1998 Knapp ................. G02B 6/1221
                                                                    385/123
2010/0149073 A1* 6/2010 Chaum .............. G02B 27/0093
                                                                    345/8

(Continued)

FOREIGN PATENT DOCUMENTS

CN           206741082           12/2017

OTHER PUBLICATIONS

Translation of the First Office Action dated Sep. 10, 2018 for Chinese Application No. 201611234914.X, 13 pages.

(Continued)

*Primary Examiner* — William R Alexander (57) ABSTRACT

An apparatus for use with a head wearable display includes a curved eyepiece for guiding display light received at an input surface peripherally located from a viewing region and emitting the display light along an eye-ward direction in the viewing region. The curved eyepiece includes an optical combiner, an eye-ward facing surface that is concave, a world facing surface that is convex, and a curved lightguide disposed between the eye-ward facing and world facing surfaces to guide the display light via total internal reflections from the input surface to the viewing region. The optical combiner is disposed within the curved eyepiece at the viewing region to redirect the display light towards the eye-ward direction. The optical combiner includes a pattern of reflective elements separated by interstitial regions. The interstitial regions pass ambient light incident through the world facing surface such that the viewing region is partially see-through.

19 Claims, 6 Drawing Sheets

(52) U.S. Cl.
CPC ....... *G02B 27/0101* (2013.01); *G02B 27/017* (2013.01); *G02B 2027/013* (2013.01); *G02B 2027/0125* (2013.01); *G02B 2027/0154* (2013.01); *G02B 2027/0159* (2013.01); *G02B 2027/0178* (2013.01); *G02B 2027/0194* (2013.01)

(58) Field of Classification Search
CPC ............ G02B 6/003; G02B 2027/0125; G02B 2027/013; G02B 2027/0154; G02B 2027/0159; G02B 2027/0178; G02B 2027/0194
USPC .......................................................... 359/631
See application file for complete search history.

(56) References Cited

U.S. PATENT DOCUMENTS

| | | | | |
|---|---|---|---|---|
| 2010/0150508 | A1* | 6/2010 | Yasuda | G02B 6/3636 385/126 |
| 2010/0289980 | A1* | 11/2010 | Husemann | G02B 6/0088 349/58 |
| 2012/0002294 | A1* | 1/2012 | Dobschal | G02B 27/0172 359/630 |
| 2012/0044573 | A1* | 2/2012 | Simmonds | G02B 27/0172 359/631 |
| 2013/0050833 | A1* | 2/2013 | Lewis | G06K 9/00604 359/630 |
| 2013/0077049 | A1* | 3/2013 | Bohn | G02B 5/20 351/210 |
| 2015/0062707 | A1* | 3/2015 | Simmonds | G02B 27/0172 359/567 |

OTHER PUBLICATIONS

English Translation of the Chinese Patent Office Notification of the Decision to Grant dated Feb. 26, 2019 for CN Application No. 201611234914, 5 pages.

Examination Report dated Jun. 20, 2019 for corresponding GB Application No. 1620780.5, 8 pages.

DNP Supernova, "Enhanced Gain and Brightness Uniformity", Nov. 18, 2015; available for download from <<https://www.dnp-screens.com/en/products/optical-technology/fresnel-lens-technology/>>; 7 pages.

Wikipedia, "Fresnel Lens", Mar. 20, 2016; available for download from <<https://en.wikipedia.org/wiki/Fresnel_lens>>; 21 pages.

International Preliminary Report on Patentability dated Oct. 18, 2018 for corresponding International Application No. PCT/US2016/064418, 9 pages.

GB Examination Report dated Mar. 4, 2020 for corresponding GB Application No. 1620780.5, 4 pages.

European Examination Report dated Feb. 13, 2020 for corresponding EP Application No. 16813276.9, 5 pages.

* cited by examiner

FIG. 5D $$sag(x,y) = \frac{(1/R)(x^2+y^2)}{1+\sqrt{1-(1/R^2)(x^2+y^2)}} + \sum C_{m,n}x^m y^n$$

$C_{2,0} = x^2$ $C_{1,1} = x^1 y^1$ $C_{0,2} = y^2$ etc...

COEFFICIENTS TABLE

| Surface | R (mm) | $C_{0,2}=y^2$ | $C_{3,0}=x^3$ | $C_{1,2}=xy^2$ | $C_{4,0}=x^4$ | $C_{2,2}=x^2y^2$ | $C_{0,4}=y^4$ |
|---|---|---|---|---|---|---|---|
| S1 | -83.17 | 0 | 0 | 0 | 0 | 0 | 0 |
| S2 | -44.98 | 0.001686 | 0.0001044 | 1.247e-005 | 0 | 0 | 0 |
| S3 | -86.97 | 0 | 0 | 0 | 0 | 0 | 0 |
| S4 | 9.9 | -0.01176 | -0.0000546 | -0.003826 | -0.0005772 | -0.001333 | -0.0006253 |

COORDINATES TABLE

| Surface | X (mm) | Y (mm) | Z (mm) | α (deg) | β (deg) | γ (deg) |
|---|---|---|---|---|---|---|
| S1 | 0 | 0 | 0 | 0 | 0 | 0 |
| S2 | 4.99 | 0 | 1.83 | 0 | 28.75 | 0 |
| S3 | 0 | 0 | 3.8 | 0 | 0 | 0 |
| S4 | 34.6 | 0 | -3.95 | 0 | 35.87 | 0 |

FIG. 6

SEE-THROUGH CURVED EYEPIECE WITH PATTERNED OPTICAL COMBINER

CROSS REFERENCE TO RELATED APPLICATION

The presentation application is a continuation of U.S. patent application Ser. No. 15/093,235, entitled "See-Through Curved Eyepiece with Patterned Optical Combiner," and filed on Apr. 7, 2016, the entirety of which is incorporated by reference herein.

TECHNICAL FIELD

This disclosure relates generally to the field of optics, and in particular, relates to see-through head wearable displays.

BACKGROUND INFORMATION

A head mounted display ("HMD") or head wearable display is a display device worn on or about the head. HMDs usually incorporate some sort of near-to-eye optical system to create a magnified virtual image placed a few meters in front of the user. Single eye displays are referred to as monocular HMDs while dual eye displays are referred to as binocular HMDs. Some HMDs display only a computer generated image ("CGI"), while other types of HMDs are capable of superimposing CGI over a real-world view. This latter type of HMD typically includes some form of see-through eyepiece and can serve as the hardware platform for realizing augmented reality. With augmented reality the viewer's image of the world is augmented with an overlaying CGI, also referred to as a heads-up display ("HUD").

HMDs have numerous practical and leisure applications. Aerospace applications permit a pilot to see vital flight control information without taking their eye off the flight path. Public safety applications include tactical displays of maps and thermal imaging. Other application fields include video games, transportation, and telecommunications. There is certain to be new found practical and leisure applications as the technology evolves; however, many of these applications are limited due to the cost, size, weight, thickness, field of view, efficiency, and image quality of conventional optical systems used to implement existing HMDs.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Embodiments of an apparatus, system and method of operation for a curved eyepiece with a patterned optical combiner are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
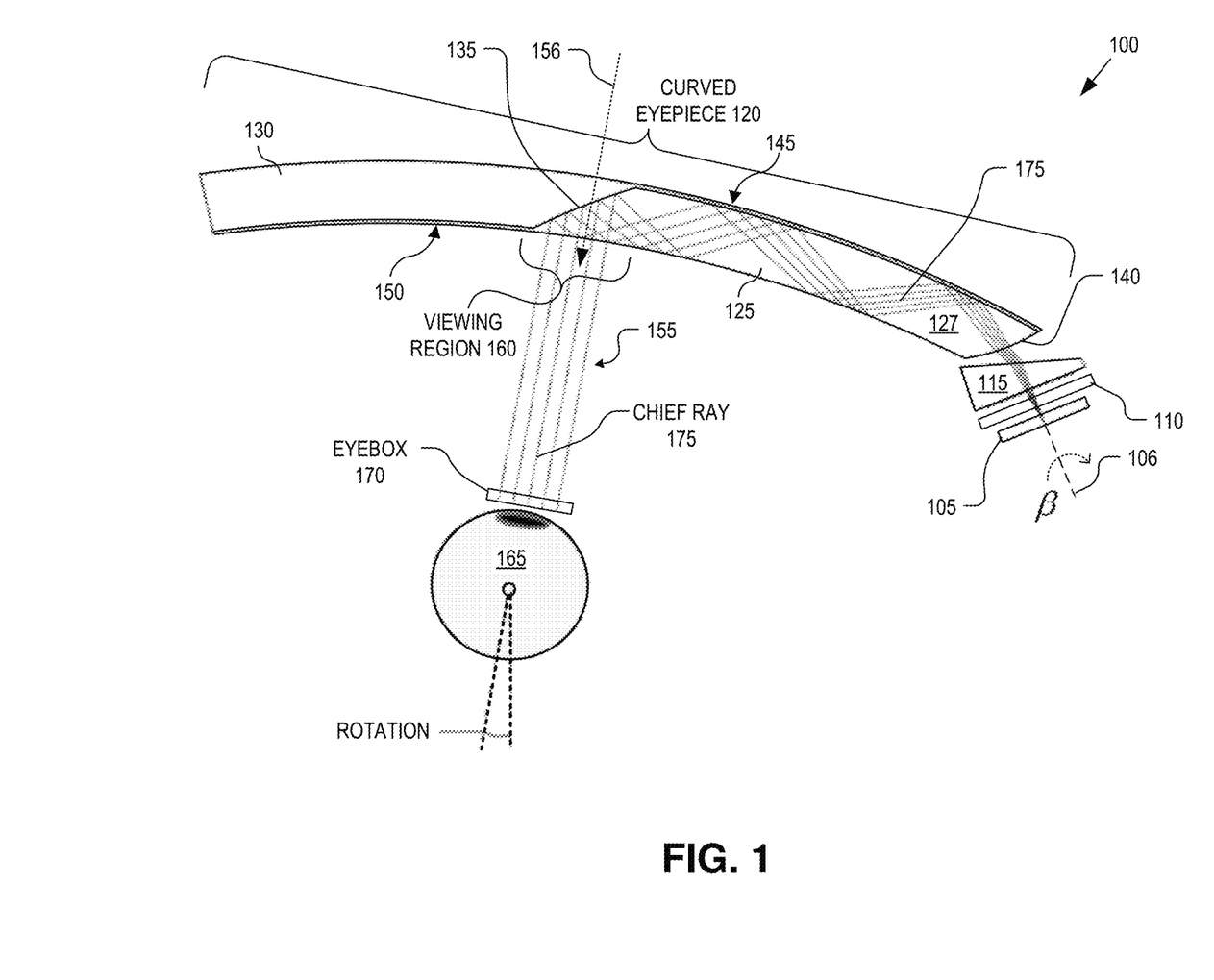
FIG. 1 is a cross-sectional illustration of an optical system for use with a head wearable display, in accordance with an embodiment of the disclosure.

FIG. 1 is a cross-sectional illustration of an optical system 100 for use with a head wearable display, in accordance with an embodiment of the disclosure. The illustrated embodiment of optical system 100 includes a display panel 105, a polarization rotator 110, a prism 115, and a curved eyepiece 120. The illustrated embodiment of curved eyepiece 120 includes a first lens body 125, in which a curved lightguide 127 is disposed, a second lens body 130, an optical combiner 135, an input surface 140, a convex world facing surface 145, and a concave eye-ward facing surface 150.

Optical system 100 is well suited for use with head wearable displays having a near eye configuration. When integrated with a head wearable display, curved eyepiece 120 receives display light 155 generated by display panel 105 through an input surface 140 peripherally located from a viewing region 160 and emits display light 155 along an eye-ward direction in viewing region 160 toward a user's eye 165 within an eyebox 170. In one embodiment, display light 155 is guided within curved lightguide 127 by total internal reflection between input surface 140 and optical combiner 135. In other embodiments, angularly selective reflective coatings (e.g., multi-layer dichroic film stack) may be applied to promote reflections within curved lightguide 127 having sufficient obliqueness while transmitting near normal angles. In the illustrated embodiment, curved eyepiece 120 is see-through allowing the user to see ambient light incident through world facing surface 145.

During operation, display panel 105 generates display light 155 to form a display image (e.g., computer generated image). Display panel 105 may be implemented using a variety of display technologies including liquid crystal ("LC") displays, light emitting diode ("LED") displays, organic LED ("OLED") displays, LC on silicon ("LCoS") displays, or other micro display technologies.

In the illustrated embodiment, display light 155 is optionally directed through a polarization rotator 110. Polarization rotator 110 is orientated to align a linear polarization of display light 155 with a centerline of curved lightguide 127 to reduce asymmetries in birefringence. The centerline represents an axis of symmetry down the center of curved lightguide 127. In one embodiment, polarization rotator 110 is a half-wave plate rotator with an angular rotation β about a normal vector (axis 106) of the emission surface of display panel 105. Polarization rotator 110 may be used in embodiments where display panel 105 is a polarized display (e.g., LCoS, micro-LCD).

Display light 155 is further directed through prism 115 prior to entering into curved lightguide 127. Prism 115 is disposed proximate to input surface 140 to pre-compensate display light 155 for lateral chromatic aberrations resulting from reflections (e.g., total internal reflections) within curved lightguide 127. Lateral chromatic aberration is deleterious to image quality since it causes color components of a color image to separate or offset laterally. Prism 115 is designed to pre-compensate for this chromatic separation.

In the illustrated embodiment, display panel 105 and prism 115 are orientated relative to curved eyepiece 120 such that chief rays 175 of display light 155 output from the pixels of display panel 105 are guided through curved lightguide 127 and directed substantially through the center of eyebox 170. Each pixel of display panel 105 has its own chief ray, which ideally, is the center normal ray projecting out from the given display pixel. Ideally, curved eyepiece 120 is designed such that the chief ray from each pixel passes through a center of eyebox 170 with each chief ray passing through the center at a different angle due to each pixel's different location on display panel 105. In other words, pixel location on display panel 105 is translated into a ray angle at eyebox 170. This ideal scenario provides improved luminance uniformity across eyebox 170. However, the ideal goal may not be achievable in practice. Accordingly, herein we define the chief ray 175 of a given pixel to be a ray emitted from display panel 105 within a cone having a three degree arc from normal (as measured from an emission surface of display panel 105) for that given pixel. This "chief ray" is close enough to normal for practical implementations. By orientating display panel 105 and prism 115 relative to curved lightguide 127 and designing curved lightguide 127 with appropriate geometries, the display image is perceived to have a high degree of uniform luminance when viewed from eyebox 170 when chief rays 175 pass substantially through a center of eyebox 170. The inclusion of prism 115 facilitates the reduction of the size of input surface 140 along with compensation of axial and lateral chromatic aberrations. In contrast, prism 115 could be omitted by tilting display panel 105 to a more oblique angle relative to input surface 140; however, doing so results in a larger input surface 140, which changes the end shape of curved eyepiece 120 near input surface 140 and reduces image brightness.

As display light 155 is guided through curved lightguide 127 from input surface 140 to viewing region 160, the curvature of curved lightguide 127 imparts optical power with each reflection or refraction. Curved eyepiece 120 imparts refractive optical power at input surface 140 and upon emission of display light 155 out eye-ward facing surface 150. The illustrated embodiment of curved eyepiece 120 imparts reflective optical power via four total internal reflection interactions and one reflection off of optical combiner 135. The optical power interactions collectively serve to magnify the display image and displace the virtual image so that the user can bring the image into focus in a near-eye configuration. It should be appreciated that curved eyepiece 120 may be implemented with other number of reflective bounces to transport display light 155 from the peripheral input region to optical combiner 135.

Figure 6:
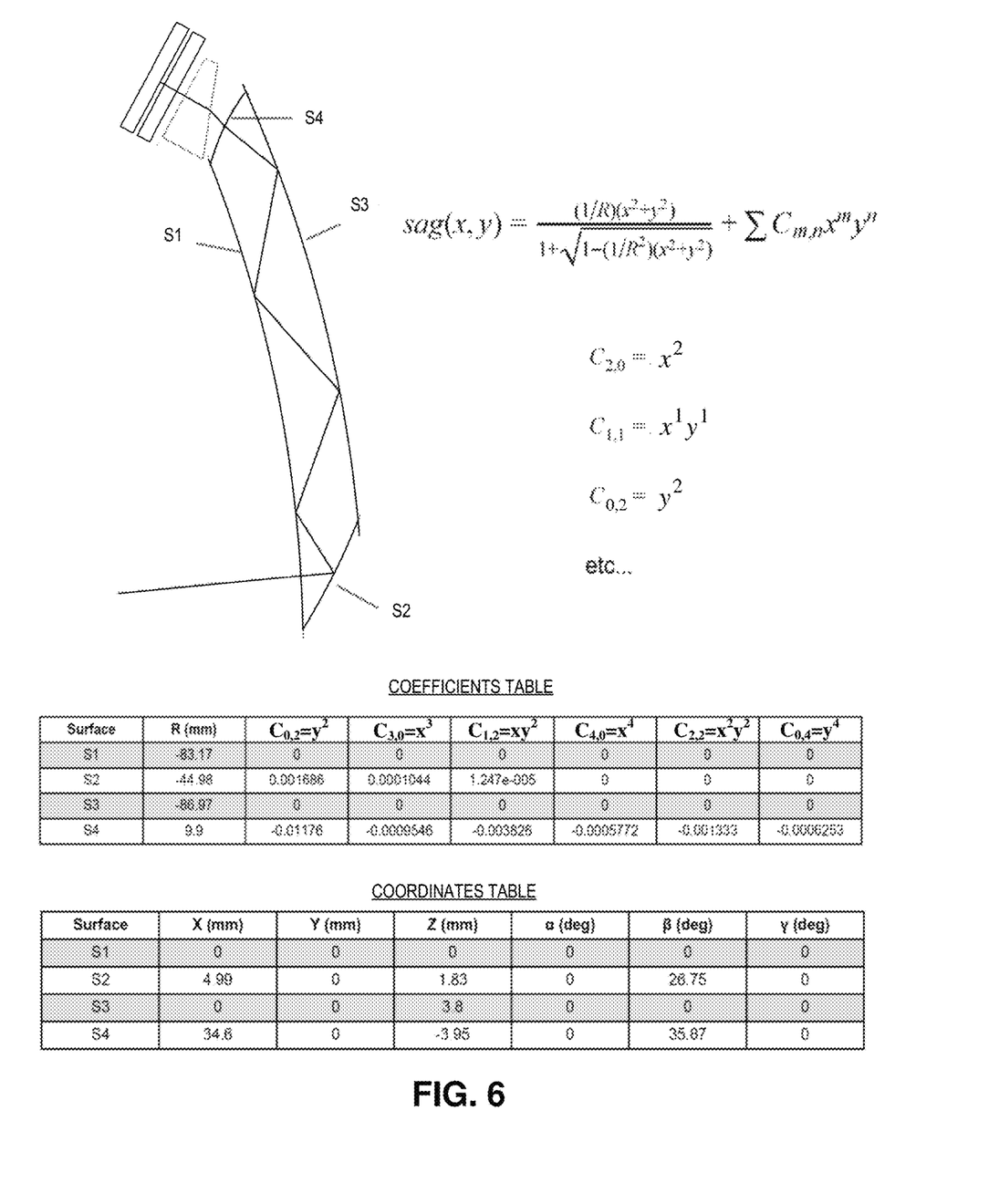
FIG. 6 provides a sag equation along with example coefficients for characterizing the surfaces of a demonstrative curved lightguide, in accordance with an embodiment of the disclosure.

FIG. 6 presents a sag equation with example coefficient values specifying example curvatures for the surfaces of curved lightguide 127 including: eye-ward facing surface 150 (S1), optical combiner surface 135 (S2), an outward facing surface (S3), and input surface 140 (S4). Surfaces S1-S4 all reside on lens body 125 and define curved lightguide 127. FIG. 6 also presents example coordinates for positioning surfaces S1 through S4. Of course, other curvatures, flat surfaces, and coordinates may be implemented. In particular, although the illustrated embodiments of surfaces S1 and S3 are described a spherical surfaces, in other embodiments, one or more of these surfaces may be described as a freeform surface, a rotationally symmetric asphere surface, an anamorphic asphere surface, a toroid surface, a Zernike polynomial surface, a radial basis function surface, an x-y polynomial surface, a non-uniform rational b-spline surface, or otherwise.

Returning to FIG. 1, optical combiner 135 is implemented using a pattern of reflective elements separated by interstitial regions. The reflective elements reflect display light 155 while the interstitial regions pass ambient light 156 incident through world facing surface 145 such that viewing region 160 (and optical combiner 135) are partially see-through. In one embodiment, the interstitial regions are gaps between adjacent reflective elements.

Figure 5A:
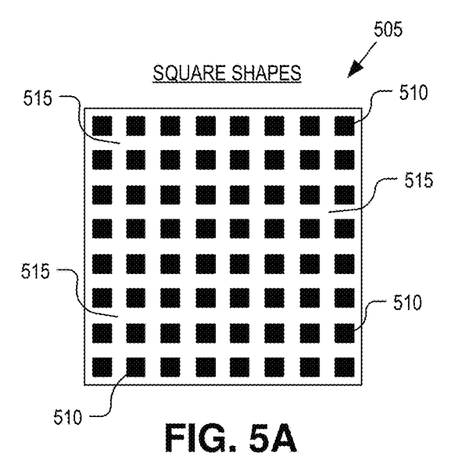
FIGS. 5A, 5B, 5C, and 5D illustrate different patterns of reflective elements for implementing an optical combiner within the curved eyepiece, in accordance with embodiments of the disclosure.
Figure 5B:
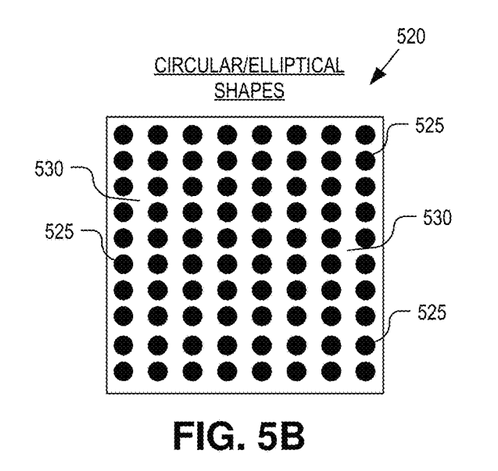
Figure 5C:
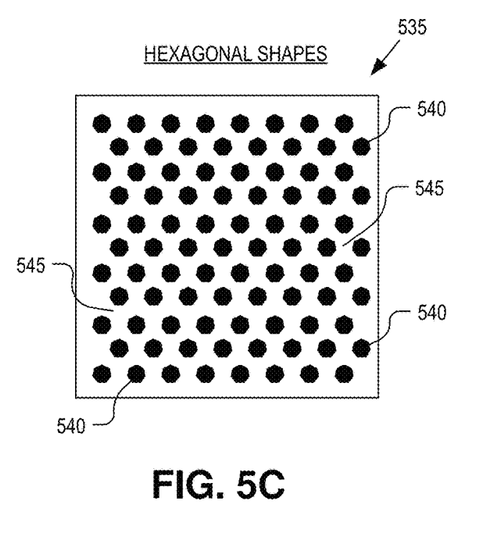
Figure 5D:
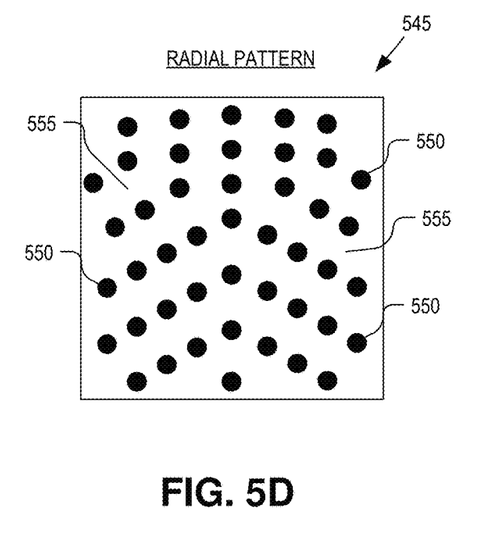

FIGS. 5A-5D illustrates example patterns of reflective elements separated by interstitial regions. FIGS. 5A-5D illustrate example implementations for optical combiner 135. FIG. 5A illustrates an example grid pattern 505 of reflective elements 510 separated by interstitial region 515. In FIG. 5A, reflective elements 510 are rectangular shaped elements. FIG. 5B illustrates an example grid pattern 520 of reflective elements 525 separated by interstitial region 530. In FIG. 5B, reflective elements 525 are circular or elliptical elements. FIG. 5C illustrates an example grid pattern 535 of reflective elements 540 separated by interstitial region 545. In FIG. 5C, reflective elements 540 are hexagonal shaped elements. FIG. 5D illustrates an example radial pattern 545 of reflective elements 550 separated by interstitial region 555. In FIG. 5D, reflective elements 550 are circular or elliptical shaped elements. It is appreciated that the reflective elements may be implemented with other geometric shapes and may be arranged into other distribution patterns. For example, the reflective elements may have a Bezier shape, or the distribution pattern may be described via a polynomial distribution, a pseudo random distribution pattern, or otherwise. Furthermore, the combination of distribution pattern and element shape is not limited to the demonstrative combinations illustrated in FIGS. 5A-5D.

In one embodiment, the reflective elements are implemented as opaque reflectors. An example opaque reflector includes a sufficiently thick layer of metal (e.g., aluminum, silver, etc.) that substantially reflects all visible light incident upon a surface of a given reflective element. Other opaque reflective materials may be used. In other embodiments, the reflective elements may be partial reflectors or beam splitters (e.g., thin silver coating, multilayer dielectric thin film, etc.). In either embodiment, the total surface area fill factor of the partial reflectors to interstitial elements is selected such that optical combiner 135 is overall more transmissive than reflective. In one embodiment, optical combiner 135 is overall less than 30% reflective to incident visible light. In an embodiment where the reflective elements are opaque reflectors, the total surface area fill factor of the reflective elements to interstitial regions (e.g., gaps) is covered less than 30% by the reflective elements to achieve an overall reflectivity of less than 30%. Accordingly, by adjusting the fill factor of reflective elements, the overall reflectivity of optical combiner 135 can be adjusted. In one embodiment, optical combiner 135 is overall 15% reflective and 85% transmissive. Of course, other reflective/transmissive ratios may be implemented to achieve a viewing region 160 that is partially transmissive to ambient light 156 incident through world facing surface 145 such that viewing region 160 is see-through.

The individual reflective elements of optical combiner 135 are sized to prevent diffraction of display light 155 upon reflection. Accordingly, the surface area and perimeter shape of the reflective elements are selected to have a minimum size and shape that substantially does not induce diffraction at visible wavelengths. For example, the reflective elements may have a diameter or width of greater than 100 um (or surface area of greater than 7,850 um$^2$. In various embodiments, the reflective elements have a diameter or width ranging between 100 um to 500 um. Of course, other dimensional sizes may be used (smaller or larger) as long as the feature size is not so small as to introduce undue diffraction in reflection (substantially undermines image quality) and is not so large as to introduce visible occlusions in the ambient light 156. However, it is noteworthy that 500 um feature sizes (e.g., 500 um diameter or width) are expected to be small enough to not be visible to the user in a near-to-eye configuration.

Figure 2:
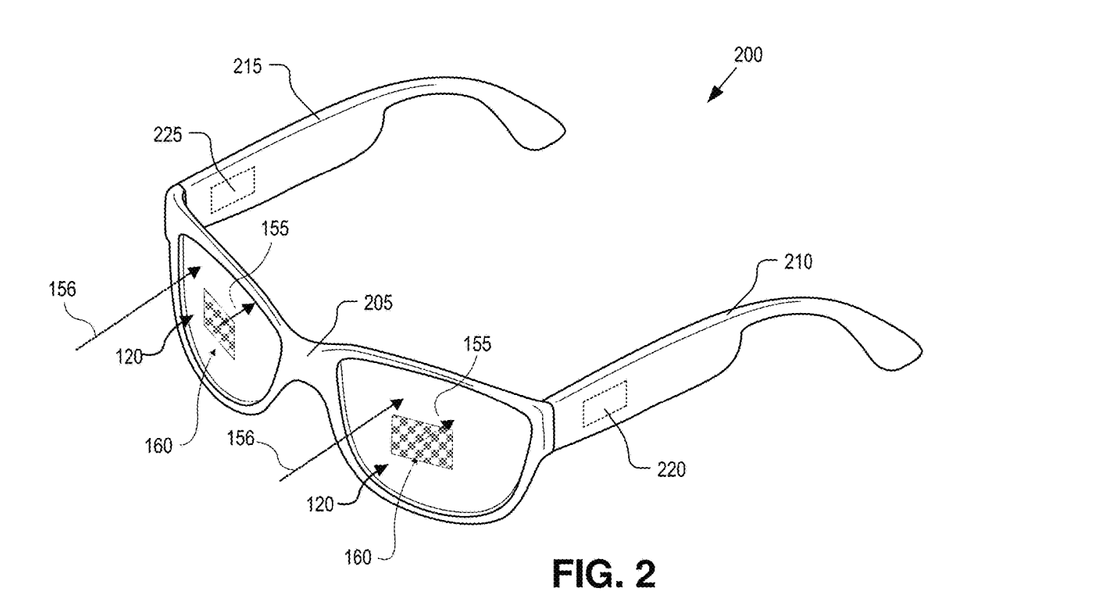
FIG. 2 is a perspective view illustration of a head wearable display including a curved eyepiece, in accordance with an embodiment of the disclosure.

FIG. 2 is a perspective view illustration of a head wearable display 200 that incorporates a left and right instance of optical system 100 with left and right instances of curved eyepiece 120, in accordance with an embodiment of the disclosure. Curved eyepieces 120 are mounted to a frame assembly, which includes a nose bridge 205, left ear arm 210, and right ear arm 215. Interior cavities 220 and 225 within left ear arm 210 and right ear arm 215 may contain various electronics including a microprocessor, interfaces, one or more wireless transceivers, a battery, a speaker, a controller, etc. In one embodiment, either of nose bridge 205 or the front facing corners of ear arms 210, 215 may contain a camera module for capturing forward facing images of the external scene or rear facing images of the user's eye(s). Although FIG. 2 illustrates a binocular embodiment, head wearable display 200 may also be implemented as a monocular display with only one curved eyepiece 120 aligned with only a single user eye when worn.

In the illustrated embodiment, curved eyepieces 120 are edged to conform to the shape of the frame assembly and secured into an eye glass arrangement so head wearable display 200 can be worn on the head of a user. The left and right ear arms 210 and 215 rest over the user's ears while nose bridge 205 rests over the user's nose. The frame assembly is shaped and sized to position viewing regions 160 (including optical combiners 135) in front of the user's eyes. In one embodiment, optical combiners 135 are positioned relative to the user's eyes such that the user looks slightly down (e.g., 7 degrees) and to the right or left (e.g., 15 degrees) to see the display image. Other angles may be implemented and other frame assemblies having other shapes may be used (e.g., a single contiguous headset member, a headband, goggles type eyewear, etc.). Optical combiners 135 within viewing regions 160 operate to redirect display light 155 to each eye while allowing ambient light 156 to pass through, thereby providing the user with an augmented view of the real-world.

Figure 3:
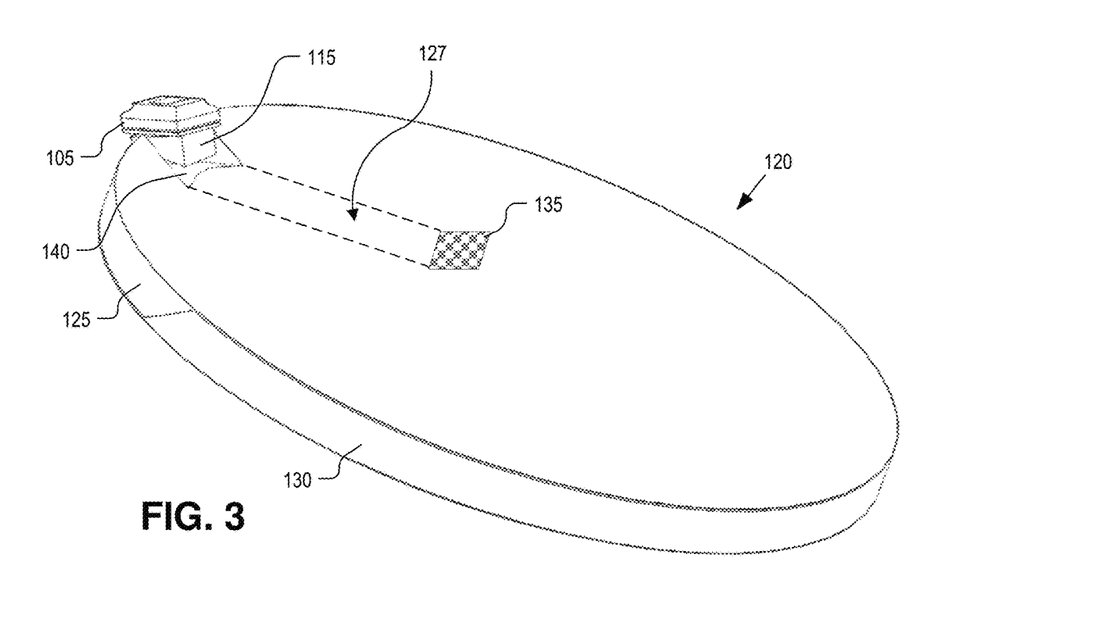
FIG. 3 is a perspective view illustration of the curved eyepiece and a display panel, in accordance with an embodiment of the disclosure.

FIG. 3 is a perspective view illustration of curved eyepiece 120 and display panel 105, in accordance with an embodiment of the disclosure. As illustrated, curved lightguide 127 guides display light 155 output from display panel 105 and received through input surface 140 to optical combiner 135. FIG. 3 further illustrates how curved eyepiece 120 is formed from two lens bodies 125 and 130 mated together. In the illustrated embodiment, curved lightguide 127 is disposed entirely within lens body 125, while lens body 130 completes the overall eyepiece to provide a see-through lens without distortion of ambient light 156 and a clean industrial design.

Figure 4A:
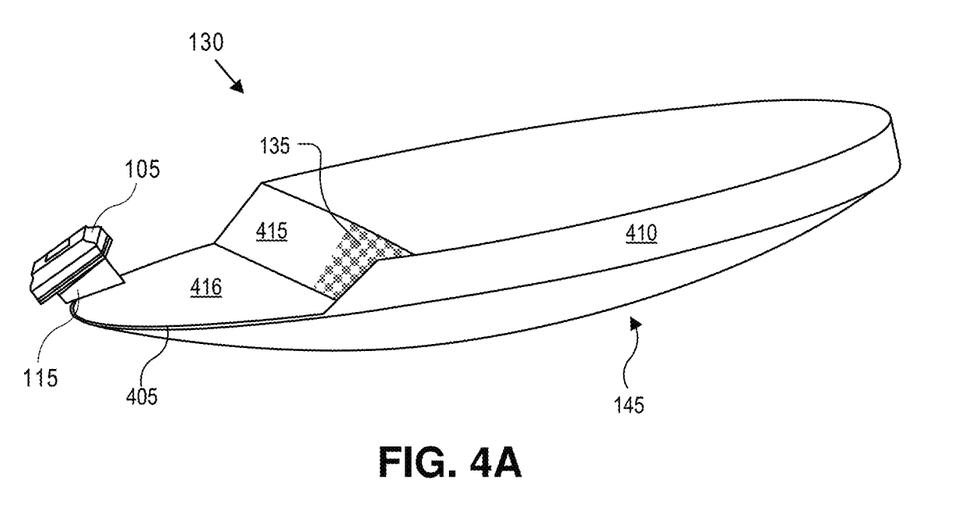
FIGS. 4A, 4B, and 4C all illustrate different perspective views of the first and second lens bodies that mate together to form the curved eyepiece, in accordance with an embodiment of the disclosure.
Figure 4B:
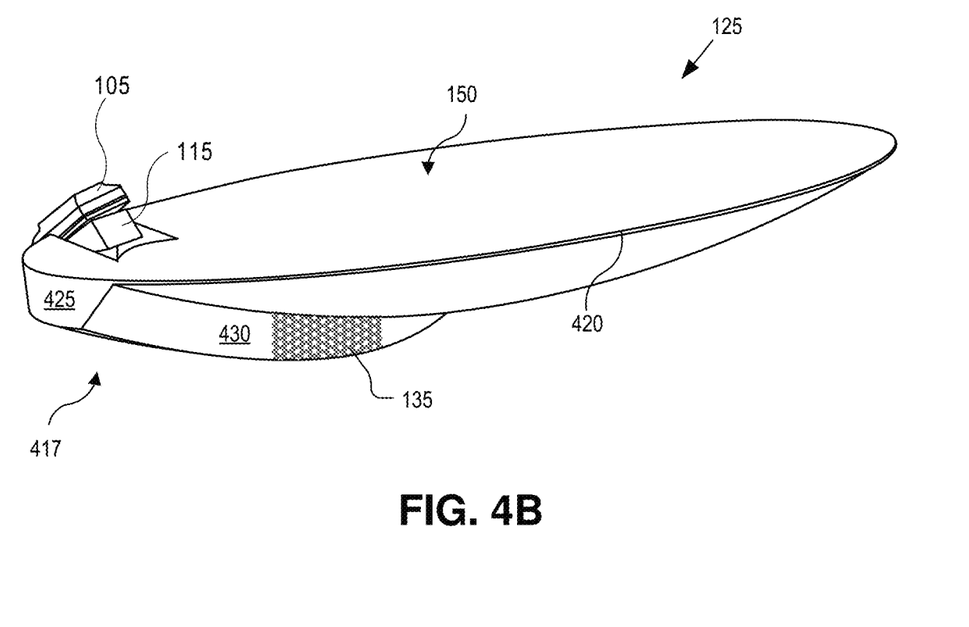
Figure 4C:
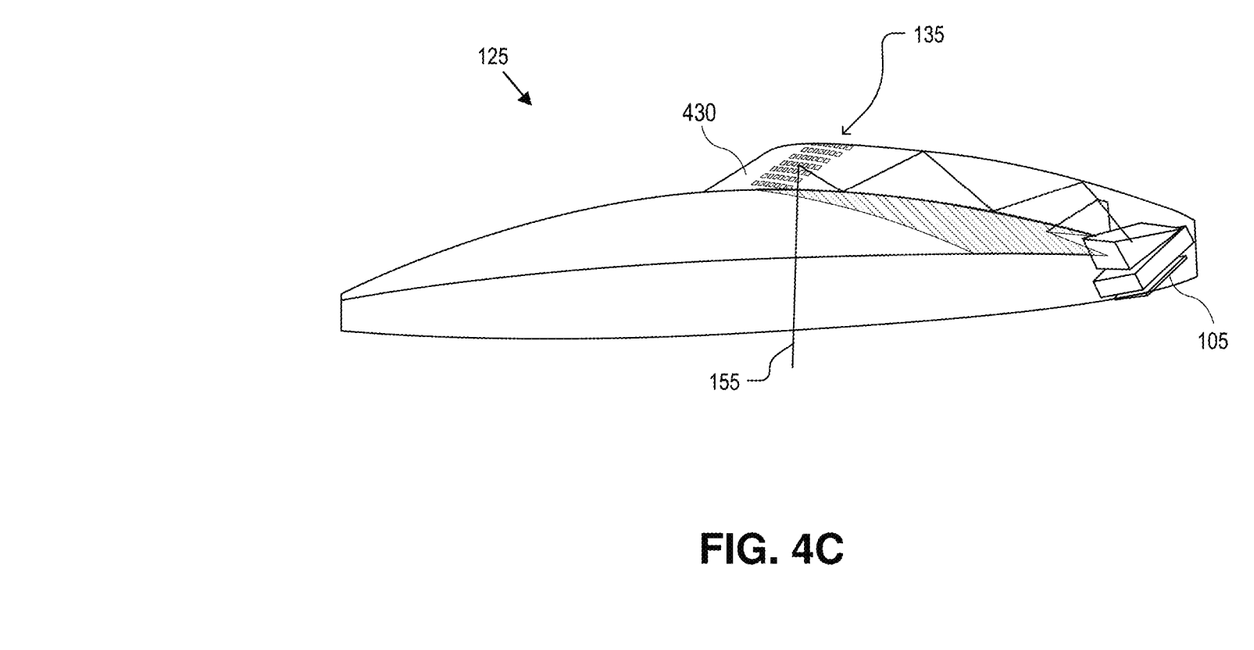

FIGS. 4A, 4B, and 4C illustrate different exploded view illustrations of lens bodies 125 and 130, in accordance with an embodiment of the disclosure. FIGS. 4B and 4C illustrate an exploded view of just lens body 125 (each from a different angle) while FIG. 4A illustrates an exploded view of just lens body 130. As illustrated, lens body 130 includes a thin portion 405, a thick portion 410, and a transition surface 415 disposed at the transition between thin portion 405 and thick portion 410. Similarly, the illustrated embodiment of lens body 125 includes a thin portion 420, a thick portion 425, and a transition surface 430 disposed at the transition between thin portion 420 and thick portion 425. In one embodiment, lens body 125 is mated to lens body 130 using a clear adhesive having a refractive index that is less than the refractive index of lens bodies 125 and 130. The low index clear adhesive forms a total internal reflection ("TIR") boundary between the two lens bodies 125 and 130, which defines an interior boundary of curved lightguide 127 within thick portion 425 of lens body 125. In the illustrated embodiment, the low index clear adhesive can be applied to surface 416 (FIG. 4A) and/or surface 417 (FIG. 4B) to form the TIR boundary. Of course, the same adhesive may also be applied to bond the other interface surfaces between lens body 125 and lens body 130. Other coatings, such as an angle sensitive multi-layer dichroic coating may also be used to form the internal reflective boundary.

Viewing region 160 of curved lightguide 127 is defined by optical combiner 135 disposed at the junction or interface between transition surfaces 415 and 430 when lens bodies 130 and 125 are mated together. In various embodiments, optical combiner 135 may be formed onto one of or both of transition surfaces 415 or 430. As illustrated, optical combiner 135 need not cover the entire extent of transition surfaces 415 or 430, but rather may cover just a portion thereof. The reflective elements of optical combiner 135 conform to the curvature of transition surfaces 415 and 430. As such, the this curvature introduces optical power in reflection to display light 155, while being substantially transparent to ambient light 156 that passes through the interstitial regions between the reflective elements.

Curved eyepiece 120 is implemented as a thin, curved eyepiece having a thickness less than 8 mm, and in one embodiment is about 4.0 mm thick. Lens bodies 125 and 130 may be formed of transparent optical grade plastic (e.g., polycarbonate, etc) having an index of refraction of 1.64. However, the higher the refractive index the thinner the curved eyepiece can be designed. A direct benefit of using higher index material is to reduce the angle at which TIR occurs. This effectively enables designs that reduce the angle of the output coupler, which can either increase the size of the eyebox for a given curved lightguide thickness or reduce the overall thickness of the curved eyepeice for a given eyebox size. Using higher index material for the curved eyepiece can also provide greater flexibility in the refractive index of the optical grade adhesives used to bond the lens bodies 125 and 130 together.

The curvatures of both eye-ward facing surface 150 and world-facing surface 145 may be implemented as spherical surfaces. Collectively, the curvature and slim nature of curved eyepiece 120 provide a desirable industrial design. Curved eyepiece 120 not only has desirable industrial design, but is also efficient since ideally the only lossy bounce for display light 155 traveling from input surface 140 to optical combiner 135 is the single redirection by optical combiner 135 itself. This permits optical combiner 135 and viewing region 160 to be substantially more transmissive than reflective thereby improving the see-through characteristic of curved eyepiece 120 in viewing region 160.

In the illustrated embodiment, world facing surface 145 provides a complementary curvature to offset the optical power of the curvature of eye-ward facing surface 150 encountered by ambient light 156. Furthermore, in one embodiment, lens bodies 125 and 130 are fabricated of the same transparent materials or transparent materials having substantially the same index of refraction. Thus, curved eyepiece 120 operates as a see-through display, which combines ambient light 156 with display light 155 directed out viewing region 160 along an eye-ward direction into eye 165. In this way, curved eyepiece 120 is capable of displaying an augmented reality to eye 165; however, the combined curvatures of world facing surface 145 and eye-ward facing surface 150 of curved eyepiece 120 complement each other and collectively do not impart lensing power to ambient light 156 as it passes through curved eyepiece 120 in viewing region 160. In other embodiments, the curvatures of world facing surface 145 and eye-ward facing surface 150 may be unbalanced to impart prescriptive lensing to ambient light 156.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An apparatus for use with a head wearable display, the apparatus comprising:
   a first lens body and a second lens body, wherein a clear adhesive having a first index of refraction that is less than a second index of refraction of the first and second lens bodies provides a total internal reflection boundary between the first and second lens bodies;
   a curved eyepiece for guiding display light received at an input surface peripherally located from a viewing region and emitting the display light along an eye-ward direction in the viewing region, the curved eyepiece including:
      an eye-ward facing surface that is concave;
      a world facing surface that is convex and opposite the eye-ward facing surface;
      a curved lightguide disposed between the eye-ward facing and world facing surfaces to guide the display light via total internal reflections from the input surface to the viewing region; and
      an optical combiner disposed within the curved eyepiece at the viewing region to redirect the display light towards the eye-ward direction for output from the curved lightguide, wherein the optical combiner includes a pattern of reflective elements separated by interstitial regions, wherein the reflective elements reflect the display light and the interstitial regions pass ambient light incident through the world facing surface such that the viewing region is partially see-through, the pattern of reflective elements comprising one of a grid pattern, a radial distribution pattern, or a polynomial distribution pattern.

2. The apparatus of claim 1, wherein the reflective elements are opaque reflectors.

3. The apparatus of claim 1, wherein:
   the input surface is disposed on the first lens body and the curved lightguide in the first lens body extends from the input surface to the optical combiner; and
   the second lens body is mated to the first lens body, wherein the optical combiner is disposed along an interface surface between the first and second lens bodies.

4. The apparatus of claim 3, wherein the interstitial regions comprise gaps on the interface surface between the reflective elements.

5. The apparatus of claim 4, wherein a total surface area fill factor of the reflective elements to the gaps is covered by less than 30 percent by the reflective elements and wherein the optical combiner is overall more transmissive than reflective.

6. The apparatus of claim 3,
   wherein the first lens body has a first thick portion, a first thin portion, and a first transition surface extending between the first thick portion and the first thin portion,
   wherein the second lens body has a second thick portion, a second thin portion, and a second transition surface extending between the second thick portion and the second thin portion,
   wherein the first thick portion mates to the second thin portion and the first transition surface mates to the second transition surface, and
   wherein the optical combiner is disposed between the first and second transition surfaces.

7. The apparatus of claim 6, wherein the first and second transition surfaces are curved surfaces, wherein the curved lightguide is disposed within the first thick portion, and wherein the clear adhesive bonds the first thick portion to the second thin portion to establish the total internal reflection boundary between the first and second lens bodies.

8. The apparatus of claim 1, wherein the reflective elements each have one of a hexagonal shape, an elliptical shape, a rectangular shape, or a Bezier shape.

9. The apparatus of claim 1, wherein the pattern of reflective elements comprises a radial distribution pattern.

10. The apparatus of claim 1, wherein the pattern of reflective elements comprises a polynomial distribution pattern.

11. The apparatus of claim 1, wherein the pattern of reflective elements comprises a grid pattern.

12. A head wearable display, comprising:
   a display panel to generate display light at a peripheral location;

a curved eyepiece for guiding the display light to a viewing region offset from the peripheral location and emitting the display light along an eye-ward direction in the viewing region, the curved eyepiece including:
a first lens body and a second lens body, wherein a clear adhesive having a first index of refraction that is less than a second index of refraction of the first and second lens bodies provides a total internal reflection boundary between the first and second lens bodies;
an eye-ward facing surface that is concave;
a world facing surface that is convex and opposite the eye-ward facing surface;
a curved lightguide disposed between the eye-ward facing and world facing surfaces to guide the display light via total internal reflections from an input surface to the viewing region; and
an optical combiner disposed within the curved eyepiece at the viewing region to redirect the display light towards the eye-ward direction for output from the curved lightguide, wherein the optical combiner includes a pattern of reflective elements separated by interstitial regions, wherein the reflective elements reflect the display light and the interstitial regions pass ambient light incident through the world facing surface such that the viewing region is partially see-through, the pattern of reflective elements comprising one of a grid pattern, a radial distribution pattern, or a polynomial distribution pattern; and
a frame assembly to support the curved eyepiece and the display panel for wearing on a head of a user with the viewing region positioned in front of an eye of the user.

13. The head wearable display of claim 12, wherein the reflective elements are opaque reflectors and wherein a total surface area fill factor of the opaque reflectors to interstitial regions is covered by less than 30 percent by the opaque reflectors and wherein the optical combiner is overall more transmissive than reflective.

14. The head wearable display of claim 12, wherein:
the input surface is disposed on the first lens body and the curved lightguide extends in the first lens body from the input surface to the optical combiner; and
the second lens body is mated to the first lens body, wherein the optical combiner is disposed along an interface surface between the first and second lens bodies.

15. The head wearable display of claim 14, wherein the interstitial regions comprise gaps on the interface surface between the reflective elements.

16. The head wearable display of claim 14,
wherein the first lens body has a first thick portion, a first thin portion, and a first transition surface extending between the first thick portion and the first thin portion,
wherein the second lens body has a second thick portion, a second thin portion, and a second transition surface extending between the second thick portion and the second thin portion,
wherein the first thick portion mates to the second thin portion and the first transition surface mates to the second transition surface, and
wherein the optical combiner is disposed between the first and second transition surfaces.

17. The head wearable display of claim 16, wherein the first and second transition surfaces are curved surfaces, wherein the curved lightguide is disposed within the first thick portion, and wherein the clear adhesive bonds the first thick portion to the second thin portion to establish the total internal reflection boundary between the first and second lens bodies.

18. The head wearable display of claim 12, wherein the reflective elements each have one of a hexagonal shape, an elliptical shape, a rectangular shape, or a Bezier shape.

19. The head wearable display of claim 12, wherein a surface area of each reflective elements is sufficiently large to substantially not diffract the display light upon reflection, wherein the display light comprises visible wavelengths.

* * * * *